United States Patent
Zehavi et al.

(10) Patent No.: US 7,167,460 B2
(45) Date of Patent: Jan. 23, 2007

(54) METHOD AND APPARATUS FOR PROVIDING VARIABLE RATE DATA IN A COMMUNICATIONS SYSTEM USING NON-ORTHOGONAL OVERFLOW CHANNELS

(75) Inventors: Ephraim Zehavi, Haifa (IL); David S. Miller, Escondido, CA (US); Judith LaRocca, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 683 days.

(21) Appl. No.: 09/851,655

(22) Filed: May 8, 2001

(65) Prior Publication Data

US 2001/0024432 A1    Sep. 27, 2001

Related U.S. Application Data

(63) Continuation of application No. 08/937,052, filed on Sep. 24, 1997, now Pat. No. 6,292,476, which is a continuation of application No. 08/838,240, filed on Apr. 16, 1997, now Pat. No. 5,777,990, which is a continuation of application No. 08/395,960, filed on Feb. 28, 1995, now abandoned.

(51) Int. Cl.
*H04B 7/216* (2006.01)

(52) U.S. Cl. .................... 370/335; 370/342; 370/468

(58) Field of Classification Search ................ 370/320, 370/335, 342, 441, 442, 468; 375/130, 136, 375/137, 141
See application file for complete search history.

(56) References Cited

U.S. PATENT DOCUMENTS 3,310,631 A    3/1967    Brown ..................... 179/15

(Continued)

FOREIGN PATENT DOCUMENTS

EP          0412583        3/1986

(Continued)

OTHER PUBLICATIONS

*Advanced Engineering Mathematics*, "Orthogonal Sets of Functions/4.7" Kreyzig, Erwin, pp. 186-190, John Wiley & Sons, Inc. 1979.

*Primary Examiner*—Chirag Shah
*Assistant Examiner*—PhuongChau Ba Nguyen
(74) *Attorney, Agent, or Firm*—Phillip Wadsworth; Gregory D. Ogrod; Sandip (Micky) Minhas (57) ABSTRACT

A variable rate transmission system where a packet of variable rate data is transmitted on a traffic channel if the capacity of the traffic channel is greater than or equal to the data rate of the packet. When the rate of the packet of variable rate data exceeds the capacity of the traffic channel, the packet is transmitted on a traffic channel and at least one overflow channel. Also described is a receiving system for receiving and reassembling the data transmitted on the traffic channel and at least one additional overflow channel.

39 Claims, 5 Drawing Sheets

U.S. PATENT DOCUMENTS

| | | |
|---|---|---|
| 3,715,508 A | 2/1973 | Blasbag |
| 4,052,565 A | 10/1977 | Baxter et al. ................. 179/1.5 |
| 4,291,409 A | 9/1981 | Weinberg et al. .............. 375/1 |
| 4,301,530 A | 11/1981 | Gutleber ...................... 370/18 |
| 4,460,992 A | 7/1984 | Gutleber ...................... 370/19 |
| 4,472,815 A | 9/1984 | Gutleber ...................... 375/34 |
| 4,635,221 A | 1/1987 | Kerr ........................... 364/821 |
| 4,688,035 A | 8/1987 | Gray et al. ............ 340/825.52 |
| 4,730,340 A | 3/1988 | Frazier, Jr. ..................... 375/1 |
| 4,775,987 A | 10/1988 | Miller ........................ 370/118 |
| 4,813,040 A | 3/1989 | Futato ........................ 370/111 |
| 4,872,200 A | 10/1989 | Jansen .......................... 380/34 |
| 4,901,307 A | 2/1990 | Gilhousen et al. ............. 370/18 |
| 4,933,952 A | 6/1990 | Albrieux et al. ................ 375/1 |
| 4,939,745 A | 7/1990 | Kirimoto et al. ............... 375/1 |
| 5,003,533 A | 3/1991 | Watanabe .................. 370/85.5 |
| 5,022,046 A | 6/1991 | Morrow .......................... 375/1 |
| 5,068,849 A | 11/1991 | Tanaka ...................... 370/85.5 |
| 5,101,501 A | 3/1992 | Gilhousen et al. ............. 455/33 |
| 5,103,459 A | 4/1992 | Gilhousen et al. ............. 455/33 |
| 5,115,429 A | 5/1992 | Hluchyj et al. ............ 370/94.1 |
| 5,136,586 A | 8/1992 | Greenblatt ................ 370/110.4 |
| 5,212,684 A | 5/1993 | MacNamee et al. .......... 370/24 |
| 5,231,649 A | 7/1993 | Duncanson ................. 370/112 |
| 5,258,983 A | 11/1993 | Lane et al. .................. 370/118 |
| 5,349,580 A | 9/1994 | Hester et al. .................. 370/84 |
| 5,373,502 A * | 12/1994 | Turban ....................... 370/441 |
| 5,381,412 A | 1/1995 | Otani ........................... 370/84 |
| 5,414,796 A | 5/1995 | Jacobs et al. ................. 395/2.3 |
| 5,442,625 A * | 8/1995 | Gitlin et al. ................. 370/342 |
| 5,471,497 A | 11/1995 | Zehavi ........................ 375/200 |
| 5,583,851 A * | 12/1996 | Kato et al. ................... 370/342 |
| 5,777,990 A * | 7/1998 | Zehavi et al. ............... 370/335 |
| 6,292,476 B1 * | 9/2001 | Zehavi et al. ............... 370/335 |

FOREIGN PATENT DOCUMENTS

| | | |
|---|---|---|
| EP | 0418865 | 9/1990 |
| EP | 0444592 | 2/1991 |
| GB | 2022365 | 5/1979 |
| GB | 2182528 | 10/1986 |
| WO | 9107030 | 5/1991 |

\* cited by examiner

FIG. 1

FIG. 2a
9.6 KBPS PACKET FORMAT

FIG. 2b
4.8 KBPS PACKET FORMAT

FIG. 2c
2.4 KBPS PACKET FORMAT

FIG. 2d
1.2 KBPS PACKET FORMAT

F - REDUNDANT BINARY SYMBOLS
T - TAIL BINARY SYMBOLS

FIG. 5

METHOD AND APPARATUS FOR PROVIDING VARIABLE RATE DATA IN A COMMUNICATIONS SYSTEM USING NON-ORTHOGONAL OVERFLOW CHANNELS

CROSS-REFERENCE TO RELATED APPLICATIONS

This application is a continuation of U.S. patent application Ser. No. 08/937,052, filed Sep. 24, 1997 now U.S. Pat. No. 6,292,476, which is a continuation of U.S. patent application Ser. No. 08/838,240 filed Apr. 16, 1997 now U.S. Pat. No. 5,777,990, issued Jul. 7, 1998, which is a continuation of U.S. patent application Ser. No. 08/395,960, filed Feb. 28, 1995, abandoned (assigned to the same assignee as the present invention), which are incorporated herein by reference.

BACKGROUND OF THE INVENTION

1. Field of the Invention

The present invention relates to communications. More particularly, the present invention relates to a novel and improved communication system, wherein a user transmits variable-rate data on an allocated traffic channel, but when the user's variable transmission exceeds the capacity of the allocated traffic channel, the user is provided temporary use of an overflow channel to use with the allocated traffic channel in order to transmit the high-rate data.

2. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these modulation techniques for multiple access communication systems. The use of CDMA techniques in a multiple access communication system are disclosed in U.S. Pat. No. 4,901,307, entitled, "SPREAD SPECTRUM MULTIPLE ACCESS COMMUNICATION SYSTEM USING SATELLITE OR TERRESTRIAL REPEATERS," assigned to the assignee of the present invention, of which the disclosure thereof is incorporated by reference. The use of CDMA techniques in a multiple access communication system is further disclosed in U.S. Pat. No. 5,103,459, entitled, "SYSTEM AND METHOD FOR GENERATING SIGNAL WAVEFORMS IN A CDMA CELLULAR TELEPHONE SYSTEM," assigned to the assignee of the present invention, of which the disclosure thereof is incorporated by reference.

The method and apparatus for the generation of a pseudorandom noise (PN) signal that is well suited for CDMA applications is disclosed in U.S. Pat. No. 5,228,054 issued Jul. 13, 1993, entitled, "POWER-OF-TWO LENGTH PSEUDO-NOISE SEQUENCE GENERATOR WITH FAST OFFSET ADJUSTMENT," assigned to the assignee of the present invention, of which the disclosure thereof is incorporated by reference.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in copending U.S. Pat. No. 5,101,501, entitled, "SOFT HANDOFF IN A CDMA CELLULAR TELEPHONE SYSTEM," and copending U.S. Pat. No. 5,109,390, entitled, "DIVERSITY RECEIVER IN A CDMA CELLULAR TELEPHONE SYSTEM," both assigned to the assignee of the present invention and incorporated by reference herein.

An additional technique that may be used to increase the efficiency of the allocation of the communication resource is to allow the users of the resource to provide data at varying rates thereby using only the minimum amount of the communication resource to meet their service needs. An example of a variable rate data source is a variable rate vocoder, which is detailed in U.S. Pat. No. 5,414,796, issued May 9, 1995, entitled, "VARIABLE RATE VOCODER," assigned to the assignee of the present invention and incorporated herein by reference. Since speech inherently contains periods of silence, i.e. pauses, the amount of data required to represent these periods can be reduced. Variable rate vocoding most effectively exploits this fact by reducing the data rate for these periods of silence.

In a variable rate vocoder of the type described in aforementioned U.S. Pat. No. 5,414,796, approximately 40% of the speech packets are coded at full rate. In the vocoder described in the patent application, the encoding rate is selected in accordance with the packet energy. When the packet energy exceeds a full rate threshold the speech is coded at full rate. In U.S. patent application Ser. No. 08/288,413, entitled, "IMPROVED METHOD AND APPARATUS FOR SELECTING AN ENCODING RATE IN A VARIABLE RATE VOCODER," assigned to the assignee of the present invention and incorporated herein by reference, a method for determining based on characteristics of the speech packet if some of the packets to be coded at full rate can be coded at a lower rate without sacrificing perceived quality.

A variable rate speech encoder provides speech data at full rate when the talker is actively speaking, thus using the full capacity of the transmission packets. When a variable rate speech coder is providing speech data at a less that maximum rate, there is excess capacity in the transmission packets. A method for transmitting additional data in transmission packets of a fixed, predetermined size, wherein the source of the data for the data packets is providing the data at a variable rate is described in detail in copending U.S. Pat. No. 5,504,773, issued Apr. 2, 1996, entitled "METHOD AND APPARATUS FOR THE FORMATTING OF DATA FOR TRANSMISSION," assigned to the assignee of the present invention, of which the disclosure thereof is incorporated by reference herein. In the above-mentioned patent application a method and apparatus is disclosed for combining data of differing types from different sources in a data packet for transmission.

SUMMARY OF THE INVENTION

A communications resource is typically divided into communications channels. Typically, each of these channels has the same capacity. A communications system could reallocate the channels to the users for each transmission. This would theoretically allow for a maximally efficient allocation of the communication resource because each user would be using only the amount of the resource absolutely necessary. However, this technique would result in unacceptable complexity in the resulting receiver and transmitter design.

In the present invention, an efficient method of transmitting and receiving variable rate data is disclosed. In the present invention, each user is provided with a voice or data channel, also referred to as a traffic channel, specifically allocated for that user. In addition, each user is provided with selective access to a pool of overflow channels that are for use by all users of the communications resource. If a user needs to transmit at a rate higher than the capacity of the allocated traffic channel then the user transmits the information using both the allocated traffic channel and an overflow channel.

In the exemplary embodiment, the communication system is a code division multiple access (CDMA) communication system as is described in detail in the aforementioned U.S. Pat. Nos. 4,901,307 and 5,103,459. In the exemplary embodiment each of the traffic channels are orthogonal to one another. Each traffic channel is spread by a unique Walsh sequence that is orthogonal to the other Walsh sequences. The spread signals are then spread by pseudorandom noise (PN) sequences and then transmitted.

In the exemplary embodiment, the overflow channels are not provided with unique orthogonal Walsh spreading sequences, because this would decrease system capacity. Instead, the system spreads the overflow channel portion of the information by a Walsh sequence that is not unique from those used in spreading the traffic channels. This portion is then spread by a PN sequence. The PN sequence is unique from the PN sequence used to spread the traffic channel of the same Walsh sequence. In the exemplary embodiment the traffic channel and the overflow channel use, although not necessarily, the same Walsh spreading sequence.

In the exemplary embodiment, the receiver continuously monitors both the traffic channel and the overflow channel. If the receiver determines that information is being transmitted on both the traffic channel and an overflow channel then the receiver decodes both portions of the message, combines the portions and provides the decoded message to the user. In an alternative embodiment, the receiver need not continuously monitor the overflow channel, but rather only monitors the overflow channel when instructed by information on the traffic channel that directs the receiver to monitor the overflow channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout.

DETAILED DESCRIPTION OF THE PREFERRED EMBODIMENTS

A multiple access communication resource is divided into parcels referred to as channels. This division is called multiplexing. Three specific types of multiplexing are frequency division multiplexing (FDM), time division multiplexing (TDM), and code division multiplexing (CDM). The basic unit of information transmitted and received in a communication system is referred to as a packet.

Figure 1:
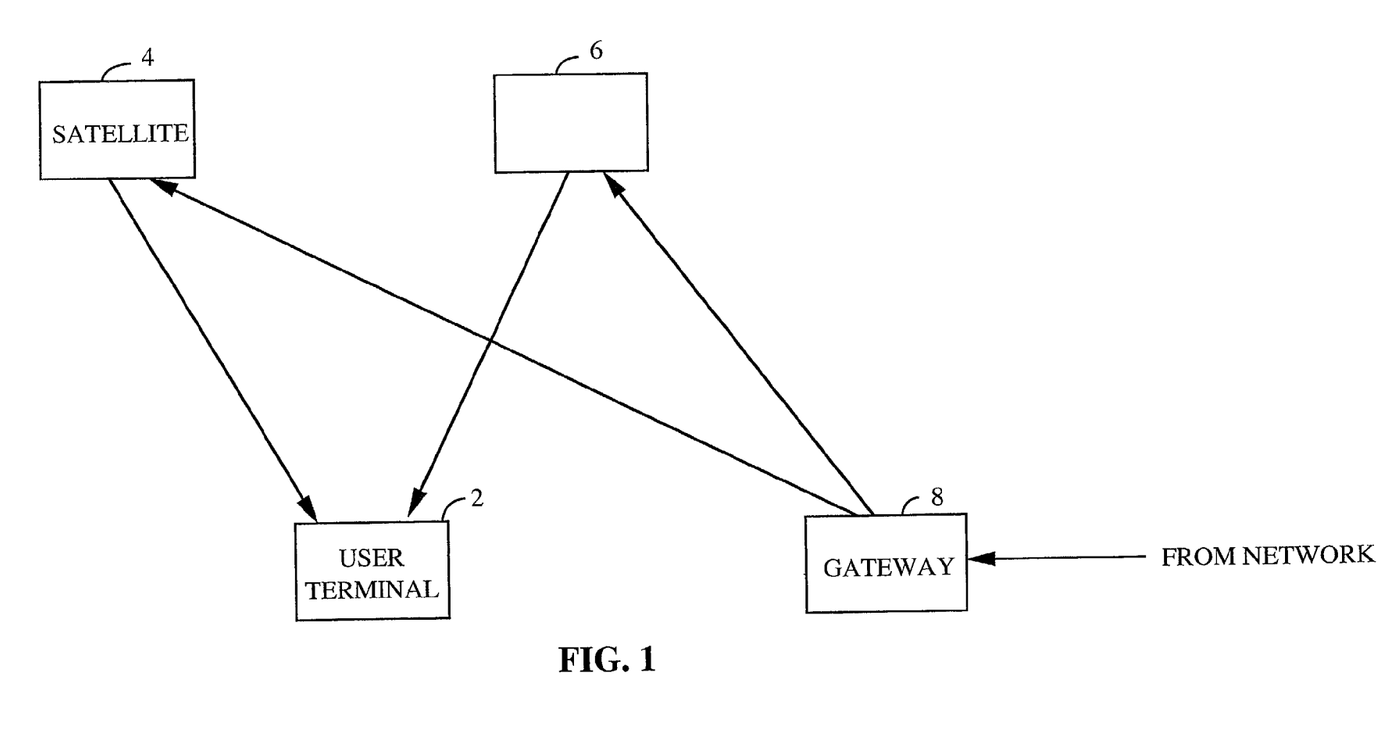
FIG. 1 is a diagram illustrating an exemplary implementation of the present invention in a satellite communication system.

Referring now to the figures, FIG. 1 illustrates the exemplary implementation of the present invention. In FIG. 1, the present invention is implemented in a satellite communications network. It should be understood that the present invention may be utilized in a terrestrial-based system, such as one where base stations are used to communicate with remote stations. The network is used to communicate information to a remote user station or terminal 2 from gateway 8 via satellites 4 and 6, which may be either geosynchronous or low earth orbit (LEO) types. User terminal 2 may be a mobile station, such as a portable telephone or other portable or mobile communications device, or user terminal 2 may be a fixed communications device, such as a wireless local loop terminal or a central communications center, such as a cellular base station. Although only two satellites, a single user terminal, and a single gateway are shown in FIG. 1 for ease in illustration, a typical system may contain a plurality of all.

In the exemplary embodiment, satellites 4 and 6 are transponders or non-regenerative repeaters that simply amplify and re-transmit the signal received from gateway 8. The present invention is equally applicable to cases where satellites 4 and 6 are regenerative repeaters that demodulate and reconstitute the signal prior to retransmission. In the exemplary embodiment, the signal transmitted from gateway 8 to satellites 4 and 6 is a spread spectrum signal. In addition, the signals transmitted from satellites 4 and 6 to user terminal 2 are spread spectrum communications signals. The generation of spread spectrum communications signals is described in detail in the aforementioned U.S. Pat. Nos. 4,901,307 and 5,103,459.

Gateway 8 serves as an interface from a communication network to the satellites 4 and 6, or directly to terrestrial base stations (a configuration not shown). Gateway 8 is typically a central communications center that receives data via a network (not shown), which may include public switching telephone networks (PSTN) and networks specifically designed for the communications of the present invention. Gateway 8 may be connected to the network (not shown) by wireline communications or by means of an air interface. Gateway 8 provides the data received from the network via satellites 6 and 8 to user terminal 2. Similarly, gateway 8 provides data received from user terminal 2 via satellites 4 and 6 to the network.

In the exemplary embodiment, the communications network transmits variable rate data from gateway 8 to user terminal 2. A variable rate communication system communicates data where the rate of the data communicated varies with time. In the exemplary embodiment, the communications resource is divided into channels. In the exemplary embodiment, each channel has the same capacity.

In the exemplary embodiment gateway 8 communicates to user terminal 2 at one of four different information data rates. These data rates, ordered from lowest rate to highest rate, are referred to, as eighth rate, quarter rate, half rate and full rate. In the exemplary embodiment, a single traffic channel has adequate capacity to carry the packet of all rates except full rate, which requires a traffic and an overflow channel. In the exemplary embodiment, a traffic channel can carry packets of 96 bits or less. Half rate, quarter rate and eighth rate packets consist of 96, 48 and 24 bits, respectively. A full rate packet consists of 192 bits and so requires a traffic channel plus an overflow channel of equal capacity.

The present invention is easily extendible to cases where there are more or less than four rates, where the channels can carry data at a lesser subset of the possible rates, or where the highest rate requires more than two channels. The communications system of the present invention can communicate both fixed rate data and variable rate data. In the communication of fixed rate data a channel or set of channels is to be allocated for the duration of the service being provided.

In the exemplary embodiment, the channels are designated into two groups. A first group of channels is the traffic channel group. Users are allocated traffic channels or sets of traffic channels specifically for their use for the duration of service. In the exemplary embodiment, all traffic channels are orthogonal to one another. In the exemplary embodiment this orthogonality is attained by allocating a unique Walsh sequence to each user, as is described in detail in the aforementioned U.S. Pat. Nos. 4,901,307 and 5,103,459. The information packets are spread, i.e., combined, with an orthogonal function sequence, typically, a Walsh sequence, then the Walsh spread packet is mixed, i.e., spread spectrum processed with a pseudorandom noise (PN) sequence. Further details on the spread spectrum modulation of the information packets are provided in the aforementioned U.S. Pat. Nos. 4,901,307 and 5,103,459.

Overflow channels are not provided with unique orthogonal or Walsh sequences and, as such, are not assured of being orthogonal to all traffic channels. However, the PN sequence which is mixed with the spread packet is unique, so all other packets will appear as noise to the decoder of the overflow channel and the overflow channel information can be distinguished from all traffic channel information.

Table 1 below illustrates the numerology used in the exemplary embodiment of the present invention.

Figure 4:
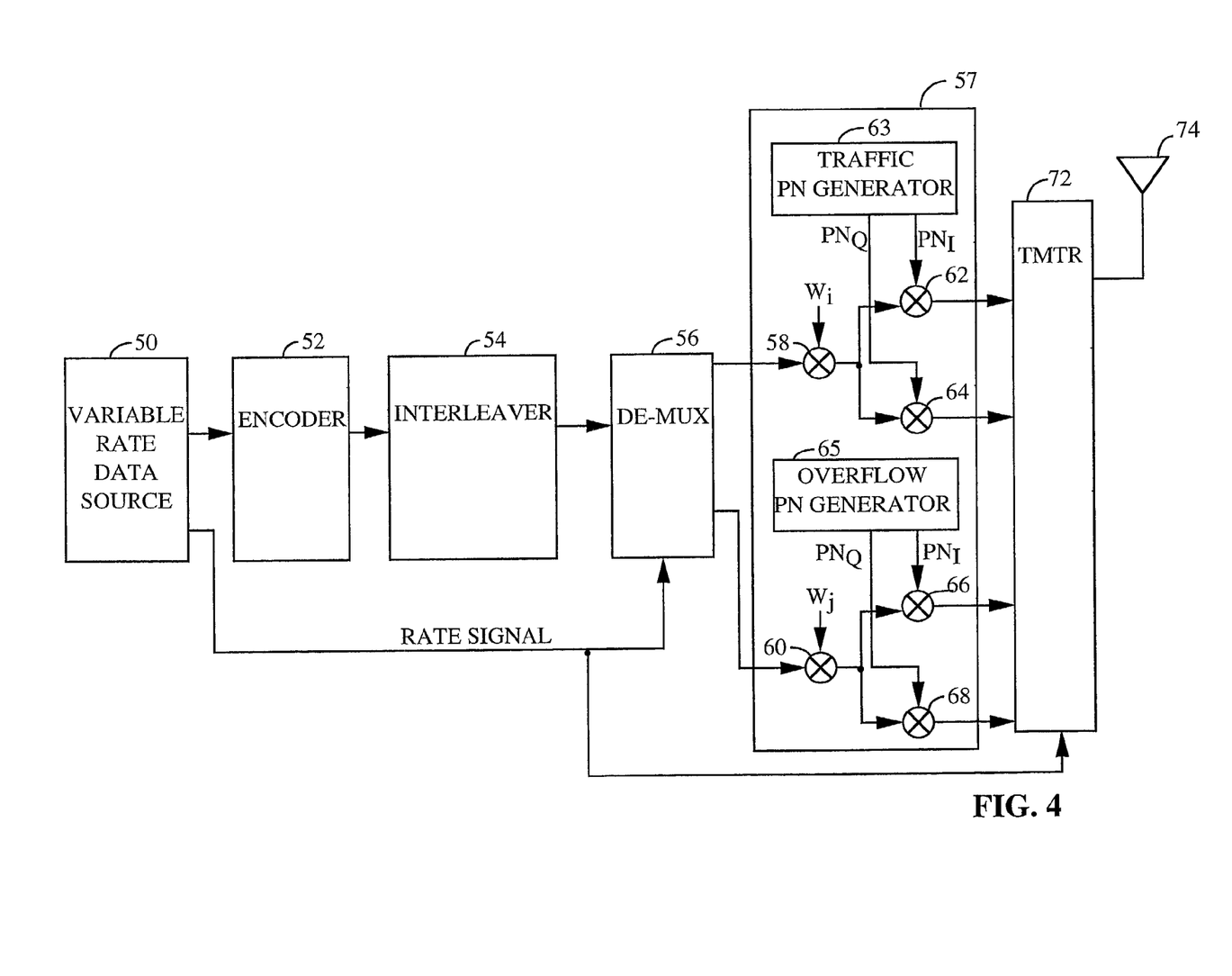
FIG. 4 is a block diagram of the transmission system of the present invention.

The exemplary embodiment of variable rate data source 50 is a variable rate vocoder as described in the aforementioned U.S. Pat. No. 5,414,796. In the exemplary variable rate vocoder, the energy of a packet of speech data is measured and compared to a set of threshold values, which determine the encoding rate. The aforementioned U.S. patent application Ser. No. 08/288,413 teaches of methods that minimize the number of packets encoded at full rate with minimum impact on perceptual quality.

Variable rate data source 50 encodes the input data and provides it at one of the predetermined rates. In the exemplary embodiment, a traffic channel is capable of carrying packets encoded at or below half rate. When a packet of data is encoded by variable rate data source 50 at full rate, then the packet must be transmitted using both a traffic channel and an overflow channel.

The data packet provided by variable rate data source 50 is provided to encoder 52. In the exemplary embodiment, encoder 52 generates a set of redundant bits in accordance with error correction and detection methods that are well known in the art. In the exemplary embodiment, the redundant bits are cyclic redundancy check (CRC) bits, the generation of which is well known in the art, and is detailed in the aforementioned U.S. Pat. No. 5,504,773.

Figure 2A:
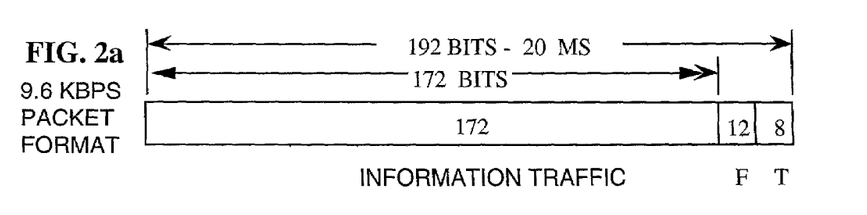
FIGS. 2a–2d are an illustration of exemplary transmission packet structures of the exemplary embodiment.
Figure 2B:
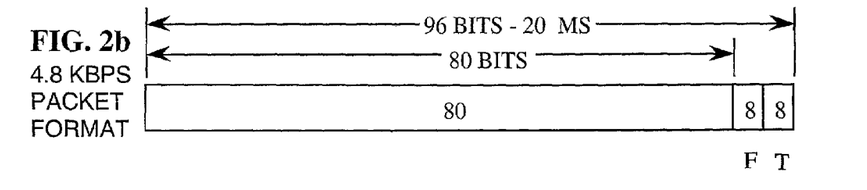
Figure 2C:
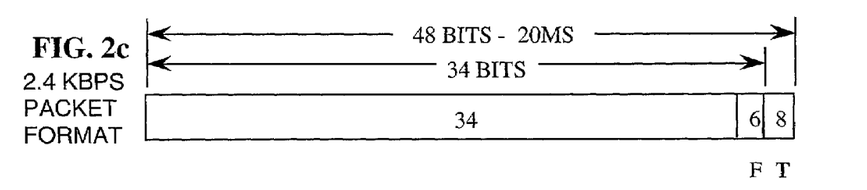
Figure 2D:
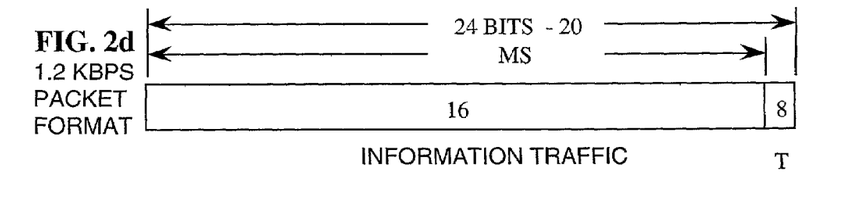

FIGS. 2a–d illustrate the packet structures of the exemplary embodiment. FIG. 2a illustrates the packet structure of a full rate packet consisting of 172 information bits followed by 12 redundant bits and then by 8 tail bits. FIG. 2b illustrates the packet structure of a half rate packet consisting of 80 information bits followed by 8 redundant bits and then by 8 tail bits. FIG. 2c illustrates the packet structure of a quarter rate packet consisting of 34 information bits followed by 6 redundant bits and then by 8 tail bits. FIG. 2d illustrates the packet structure of an eighth rate packet consisting of 16 information bits followed by 8 tail bits.

Referring back to FIG. 4, encoder 52 then encodes the formatted packet for error detection and correction as is well known in the art. In the exemplary embodiment, encoder 52

TABLE 1

EXEMPLARY NUMEROLOGY OF THE PRESENT INVENTION

| Parameter | | | | | Units |
|---|---|---|---|---|---|
| Data Rate | 8600 | 4000 | 1700 | 800 | bps |
| PN Chip Rate | 1.2288 | 1.2288 | 1.2288 | 1.2288 | Mcps |
| Code Rate | 1/2 | 1/2 | 1/2 | 1/2 | bits/code symbol |
| Code Repetition | 1 | 1 | 2 | 4 | mod sym/code sym |
| No. of Channels | 2 | 1 | 1 | 1 | |
| Modulation | BPSK | BPSK | BPSK | BPSK | |

The present invention is equally applicable to other numerologies.

FIG. 4 illustrates the transmission system of the present invention. Input data for transmission is provided to variable rate data source 50. Variable rate data source 50 provides the variable rate data to encoder 52. In the exemplary embodiment, variable rate data source 50 provides data at four different rates referred to as full rate, half rate, quarter rate and eighth rate. In the exemplary embodiment, full rate is 8.6 kbps and provides packets of 172 bits, half rate is 4 kbps and provides packets of 80 bits, quarter rate is 1.7 kbps and provides packets of 34 bits, and eighth rate is 800 bps and provides packets of 16 bits.

encodes the formatted packet in accordance with a rate ½ convolutional code. Encoder 52 provides the encoded packet to interleaver 54.

Interleaver 54 interleaves the binary symbols of the encoded packet in accordance with a predetermined interleaver format. In the exemplary embodiment, interleaver 54 is a block interleaver. In addition, interleaver 54 provides redundancy in the packets such that each interleaved packet consists of the same number of binary symbols as described below.

Figure 3A:
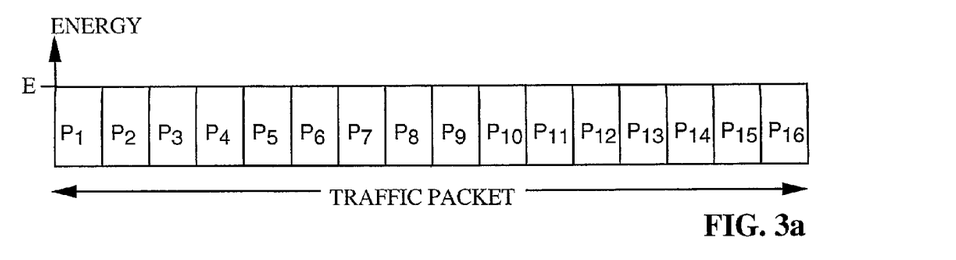
FIGS. 3a–3e are an illustration of the symbol repetition in a transmission packet and the transmission energy level of the packet.
Figure 3B:
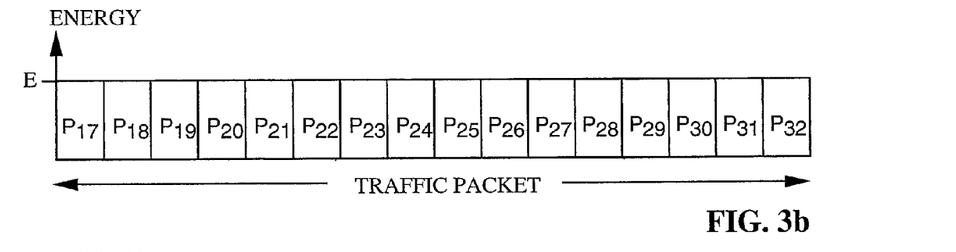
Figure 3C:
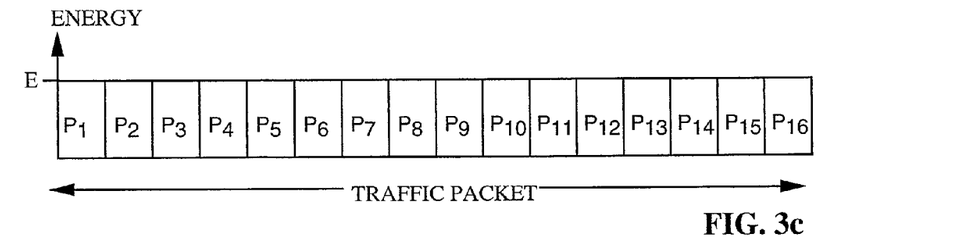
Figure 3D:
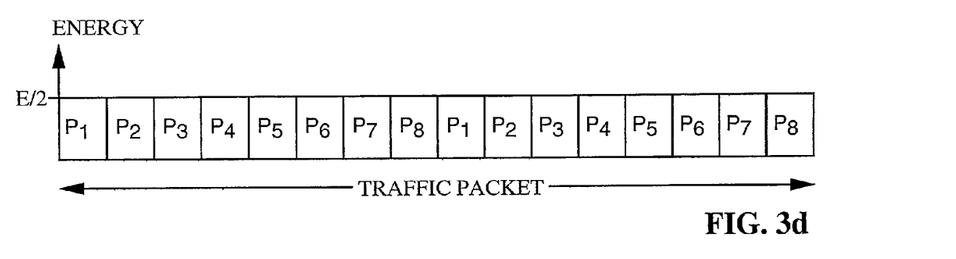
Figure 3E:
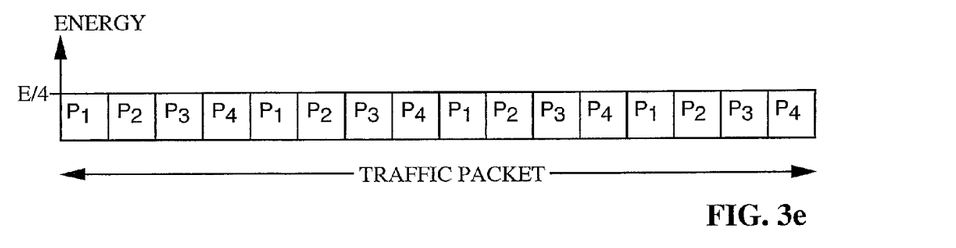

Referring to FIGS. 3a–3e in conjunction with FIG. 4, interleaver 54 interleaves the binary symbols of the packet, then groups the reordered binary symbols into power control groups. FIGS. 3a and 3b illustrate a full rate packet organized into a packet format. Because a full rate packet of a transmission packet requires two channels, the first portion of the packet illustrated in FIG. 3a is organized into a traffic packet and transmitted on the traffic channel. The second portion of the full rate packet as illustrated in FIG. 3b is organized into an overflow packet and transmitted on an overflow channel. For the full rate packet interleaver 54 does not provide symbol repetition. Since the symbol data fills the traffic channel and the overflow channel packet. In the exemplary embodiment, each power control group consists of 12 binary symbols. FIG. 3c illustrates a half rate packet organized into a packet format. Note that because transmission of the half rate packet utilizes the full capacity of the traffic channel packet, there is no symbol repetition provided in the packet. FIG. 3d illustrates a quarter rate packet organized into a packet format, in which each symbol is provided twice. FIG. 3e illustrates an eighth rate packet organized into packet format, in which each symbol is provided four times.

Referring again to FIG. 4, the interleaved packet is provided by interleaver 54 to de-multiplexer 56, which operates in accordance with a rate signal provided by variable rate data source 50. If the packet is such that it can be carried on the traffic channel without need of an overflow channel, then the interleaved packet is provided through de-multiplexer (DE-MUX) 56 without any change to modulator 57. If, on the other hand, the packet requires use of an overflow channel for transmission, then de-multiplexer 56 splits the packet into two portions. The de-multiplexed packet is provided by de-multiplexer 56 to modulator 57. Buffering may be added to ensure two portions are simultaneously provided to modulator 57.

In the exemplary embodiment, if the packet is of a rate less than full rate, then the entire packet is provided to combining element 58, which in the exemplary embodiment is a digital multiplier modulo 2 adder or exclusive or gate. The interleaved packet is spread by an orthogonal function $W_i$, as is described in detail in the aforementioned U.S. Pat. No. 5,103,459. In the exemplary embodiment, orthogonal function $W_i$ is a Walsh function the selection of which is detailed in the aforementioned U.S. Pat. No. 5,103,459. In the exemplary embodiment, each Walsh sequence, $W_i$, is uniquely provided for use by User (i).

The orthogonal function spread packet from element 58 is provided to quadrature spreading elements 62 and 64 which are employed as digital multipliers modulo 2 adder or exclusive or gates. The orthogonal function spread packet is spread in quadrature spreading elements 62 and 64 by pseudorandom noise (PN) functions $PN_I$ and $PN_Q$, respectively. $PN_I$ and $PN_Q$ are generated by traffic PN generator 63. In the exemplary embodiment, the pseudorandom noise signals are generated by a maximal shift register where the PN sequence is determined by the temporal offset of the register. The design and implementation of such registers is described in detail in the aforementioned copending U.S. Pat. No. 5,228,054. The quadrature spread packets are provided from quadrature spreading elements 62 and 64 to transmitter 72.

Transmitter 72 converts the signal to analog form, frequency up-converts and amplifies the signal for transmission transmitter 72 amplifies the signal in accordance with the rate of the packet. The relationship between the necessary transmission energy and the amount of repetition is illustrated in FIGS. 3a–3e. When a redundancy is present in a packet, the packet can be transmitted at a lower energy with redundant portions combined at the receiver. In a full rate packet, both the packet on the traffic channel (traffic packet) FIG. 3a and the packet transmitted on the overflow channel (overflow packet) FIG. 3b are transmitted at a maximum bit energy E. In FIG. 3c, there is no repetition in the half rate packet so the packet is also provided at energy level E. In FIG. 3d, there is a repetition rate of two so the packet is provided at half the packet energy of the half rate packet or E/2. In FIG. 3e, there is a repetition rate of four so the packet is provided at a quarter of the packet energy of the half rate packet or E/4. Transmitter 72 amplifies and up-converts the signal and provides it to antenna 74 for broadcast to a receiver.

In the case where a packet requires use of an overflow channel for transmission that is the packet is a full rate packet, then de-multiplexer 56 splits the interleaved packet into two halves and provides a first half to combining element 58 and a second half of the packet to combining element 60, which is also embodied as a digital multiplier, modulo 2 adder or an exclusive-or gate. The modulation of the first half of the packet proceeds as described previously for packets of less than full rate. The modulation of the second half of the packet is the same except that the spreading functions are different.

Now turning to the specifics of the modulation process of modulator 57, it should be noted that a spread spectrum communication system is primarily limited in capacity by the number of unique orthogonal functions or in the exemplary embodiment Walsh functions available. If one allocates a subset of these functions for the purpose of modulating the overflow channels, then the capacity of the system is reduced.

In the present invention, all of the traffic channels are orthogonal to one another because each is modulated by a unique Walsh function ($W_i$) or Walsh code sequence. However, the Walsh functions provided for modulation of the overflow channel ($W_j$) will overlap those allocated for modulation of the traffic channel and so are not orthogonal to the traffic channels. In the exemplary embodiment, $W_i$ is the same Walsh function as $W_j$. That is, the same Walsh code function spreads the traffic channel portion of the packet as it spreads the overflow portion of the packet. The two signals are distinguished from one another by subsequent PN code sequence spreading.

The spread packet from combining element 60 is provided to quadrature spreading elements 66 and 68, which may be embodied as digital multipliers, modulo 2 adders, or exclusive-or gates. Quadrature spreading elements 66 and 68 spread the packet from spreading element 60 in accordance with pseudorandom noise functions $PN_{I'}$ and $PN_{Q'}$. Pseudorandom noise functions $PN_{I'}$ and $PN_{Q'}$ are generated by overflow PN generator 67. In the exemplary embodiment, pseudorandom noise functions $PN_{I'}$ and $PN_{Q'}$ are generated in the same manner as pseudorandom noise functions $PN_I$ and $PN_Q$, but are unique due to different temporal offsets in the code sequences.

In a first exemplary embodiment, pseudorandom noise functions $PN_I$ and $PN_Q$ and pseudorandom noise functions $PN_{I'}$ and $PN_{Q'}$ are short codes. A short code is a code in which the number of sequences generated is relatively few. In the exemplary embodiment, the PN generator provides a bit stream that is periodic with a period of $2^{15}$ PN chips. The benefit of this implementation is that it allows a faster acquisition at the receiver. In an alternative embodiment, pseudorandom noise functions $PN_{I'}$ and $PN_{Q'}$ are short codes, but pseudorandom noise functions $PN_{I'}$ and $PN_{Q'}$ are long codes. This has the potential of advantage of greater separation in code space, while allowing the mobile to acquire using the demodulation of the first subpacket modulated by the short code.

The modulated overflow packet from quadrature spreading elements 66 and 68, as well as the modulated traffic packet from quadrature spreading elements 62 and 64 are provide to transmitter 72. Transmitter up-converts and amplifies the signal and provides the signal to antenna 74 for broadcast. The subpackets are transmitted with energy E as illustrated in FIGS. 3a and 3b (vertical axis).

Figure 5:
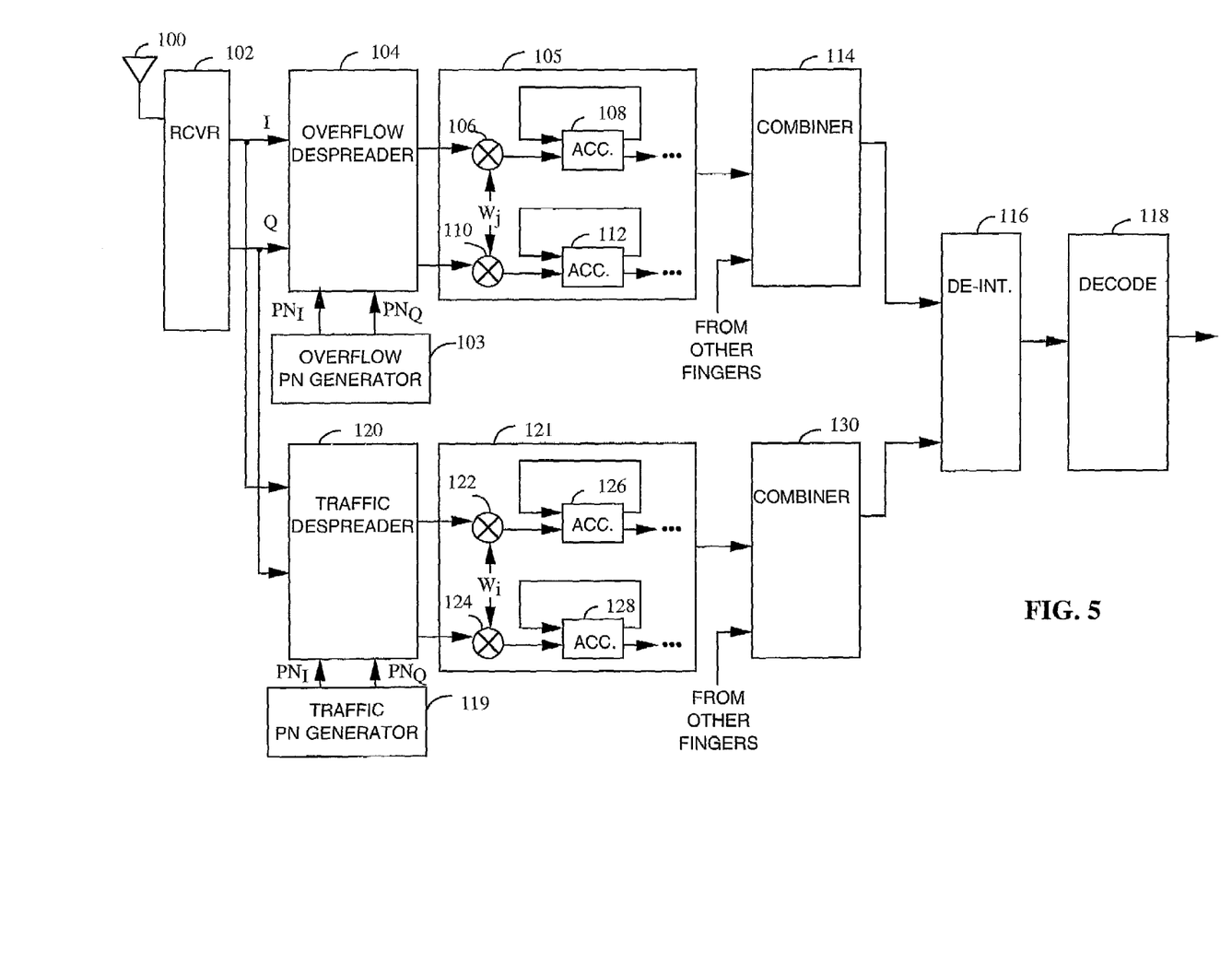
FIG. 5 is a block diagram of a receiver system of the present invention.

FIG. 5 illustrates the receiver system of the present invention. The transmitted signal is received at antenna 100 and provided to receiver 102. Receiver 102 down converts and amplifies the signal and provides the signal in its two components I and Q to overflow channel despreading element (OVERFLOW DESPREADER) 104 and to traffic channel despreading element (TRAFFIC DESPREADER) 120. In the exemplary embodiment, the I component and the Q component of the received signal carry the same data, which allows for a higher quality reception. In an alternative embodiment, the I and Q components could carry different data which would allow for higher data rate. In the exemplary embodiments, despreaders 104 and 120 are configured as QPSK despreading circuits as are well known in the art.

The received signal is provided to traffic channel despreading element (TRAFFIC DESPREADER) 120, which despreads the signal in accordance with the traffic channel pseudorandom noise codes $PN_I$ and $PN_Q$. Traffic PN generator 119 generates the $PN_I$ and $PN_Q$ sequences. In the exemplary embodiment, the PN sequences are generated by a shift register with appropriate feedback. The despreading process involves digitally multiplying the signal by the traffic channel pseudorandom noise codes $PN_I$ and $PN_Q$. This process is described in detail in the aforementioned U.S. Pat. Nos. 4,901,307 and 5,103,459. Similarly, the received signal is provided to overflow channel despreading element (OVERFLOW DESPREADER) 104, which despreads the signal in accordance with the overflow channel pseudorandom noise codes $PN_{I'}$ and $PN_{Q'}$. Overflow PN generator 103 generates the $PN_{I'}$ and $PN_{Q'}$ sequences. In the exemplary embodiment, the PN sequences are generated by a shift register with appropriate feedback. In the exemplary embodiment, the two generators are identical except that they are offset from one another temporally, which means that the traffic PN sequences and the overflow PN sequences will be unique from one another.

The despread signal is then provided to demodulation elements 105 and 121. Demodulation element 121 receives the traffic channel despread I and Q values and demodulates the signal. The demodulation process is illustrated by the digital multiplication of the signal by the Walsh function $W_i$ in multipliers 122 and 124 then the accumulation of the multiplied signal in accumulators 126 and 128. Similarly, the demodulation of the overflow channel is illustrated by the digital multiplication by the Walsh function $W_j$ in multipliers 106 and 110, then the accumulation of the multiplied signal in accumulators 108 and 112.

The demodulated signal is provided by traffic demodulator 121 to combiner element 130 and by overflow demodulator 105 to combiner element 114. The combiner elements combine received and despread data estimates from despreaders 105 and 121 with data estimates from other receiver/despreader/demodulators demodulated fingers (not shown) that are simultaneously being tracked by the receiver system. These other estimates take advantage of the delayed signals resulting from multipath signals to provide an improved signal estimate. The design and implementation of combiner elements are described in detail in the aforementioned U.S. Pat. Nos. 5,101,501 and 5,109,390.

The combiners combine the signals based upon the values of the data and the relative strengths of the signals and provide combined estimates to de-interleaving element (DE-INT) 116. De-interleaving element 116 re-orders the combined estimates of the data in accordance with a predetermined ordering format and provides the reordered data to decoder (DECODE) 118. Decoder 118 decodes the data in accordance with a predetermined decoding format. In the exemplary embodiment, decoder 118 is a Viterbi decoder of constraint length 7. The decoded packet is then provided to the receiver system user.

In an improved embodiment of the communication system of the present invention, an alternative modulation and demodulation process is provided for when system usage is low. When system usage is low, each user is provided use of one of the unique Walsh sequences for communication of its overflow data. That is, $W_i$ and $W_j$ are different so the traffic and overflow signals are orthogonal to one another. In the exemplary embodiment, $W_i$ and $W_j$ are separated by a fixed offset from one another so that the receiver knows which Walsh sequence to use to demodulate the overflow signal. In the exemplary embodiment of a communication system of 128 unique Walsh sequences, when usage is low, each user is allocated a traffic channel designated by Walsh sequence $W_i$ and uses an overflow channel designated by Walsh sequence $W_j = W_i + 64$.

When system usage rises so that the system can no longer accommodate this many unique overflow channels, that is 65 or more users, then the system transmitter will send signaling information to the receiver indicating that the overflow communications will be conducted as described previously, using the same Walsh sequence for both traffic and overflow communications. The users may be switched to the high usage mode individually as necessary or as a group.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. In code division multiple access (CDMA) communication system, wherein packets of data are transmitted using a plurality of orthogonal code sequences and wherein each user of said code division multiple is allocated an orthogonal code sequence for communication on a traffic channel for transmitting variable rate packets of data symbols, an apparatus comprising:

a channel packetizer configured to receive said variable rate packets and, when a number of said data symbols included in ones of said variable rate packets exceeds a threshold value to split each of said ones of said variable rate packets into a traffic packet and at least one overflow packet;

a first modulator configured to receive said traffic packet and to modulate said traffic packet in accordance with said orthogonal code sequence of said plurality of orthogonal code sequences and to modulate said orthogonal modulated traffic packet in accordance with a first pseudorandom noise (PN) sequence;

a second modulator configured to receive said at least one overflow packet and to modulate said at least one overflow packet in accordance with an orthogonal code sequence of said plurality of orthogonal code sequences and to modulate said at least one orthogonal modulated overflow packet in accordance with at least one additional pseudorandom noise (PN) sequence wherein said at least one additional PN sequence is nonorthogonal to said first PN sequence; and a transmitter configured to transmit said traffic packet on said traffic channel and to transmit at least one overflow packet on said at least one overflow channel.

2. The apparatus of claim 1 wherein said channel packetizer is responsive to a rate signal.

3. The apparatus of claim 1 further comprising a variable rate vocoder configured to receive speech samples and to compress said speech samples in accordance with a variable rate vocoder format to provide said variable rate packets.

4. The apparatus of claim 3 further comprising an encoder configured to error correction code said variable rate packets.

5. The apparatus of claim 4 further comprising an interleaver configured to reorder said variable rate packets, said encoder being disposed between said variable rate vocoder and said interleaver.

6. An apparatus for transmitting variable rate packets of data symbols comprising;

means for receiving said variable rate packets and for dividing each of said variable rate packets including more than a threshold number of said data symbols into a traffic packet and into an overflow packet, each said traffic packet being provided to a first packetizer output and each said overflow packet being provided to a second packetizer output;

means for receiving said traffic packet and for modulating said traffic packet in accordance with an orthogonal code sequence of a plurality of orthogonal code sequences and having a first output for providing said orthogonal code sequence modulated traffic packet;

means for receiving said orthogonal code modulated traffic packet and for modulating said orthogonal code modulated traffic packet in accordance with a first PN sequence;

means for receiving said overflow packet and for modulating said overflow in accordance with a second orthogonal code sequence of said plurality of orthogonal code sequences and having a second output for providing said orthogonal code modulated overflow packet;

means for receiving said orthogonal code modulated overflow packet and for modulating said orthogonal code modulated overflow packet in accordance with a second PN sequence which is non-orthogonal to said first PN sequence; and a transmitter means having a first input coupled to said first modulator output and having a second input coupled to said second modulator output, said transmitter further having an output.

7. The apparatus of claim 6 wherein said channel packetizer is responsive to a rate signal.

8. The apparatus of claim 7 further comprising a variable rate vocoder for receiving speech samples and for compressing said speech samples in accordance with a variable rate vocoder format to provide said variable rate packets.

9. The apparatus of claim 8 further comprising an encoder for error correction coding said variable rate packets.

10. The apparatus of claim 9 further comprising an interleaver for reordering said variable rate packets, said encoder being disposed between said variable rate vocoder and said interleaver.

11. An apparatus for transmitting variable rate packets of data symbols comprising;

a channel packetizer having an input for receiving said variable rate packets and for dividing each of said variable rate packets including more than a threshold number of said data symbols into a traffic packet and into an overflow packet, each said traffic packet being provided to a first packetizer output and each said overflow packet being provided to a second packetizer output;

a first modulator having an input for receiving said traffic packet and for modulating said traffic packet in accordance with an orthogonal code sequence of a plurality of orthogonal code sequences and having a first output for providing said orthogonal code sequence modulated traffic packet;

a first PN modulator having an input for receiving said orthogonal code modulated traffic packet and for modulating said orthogonal code modulated traffic packet in accordance with a first PN sequence;

a second modulator having an input for receiving said second packet and for modulating said traffic packet in accordance with a second orthogonal code sequence of said plurality of orthogonal code sequences and having a second output for providing said orthogonal code modulated traffic packet;

a second PN modulator having an input for receiving said orthogonal code modulated overflow packet and for modulating said orthogonal code modulated overflow packet in accordance with a second PN sequence which is non-orthogonal to said first PN sequence; and a transmitter having a first input coupled to said first modulator output and having a second input coupled to said second modulator output, said transmitter further having an output.

12. The apparatus of claim 11 wherein the first PN modulator and the second PN modulator is responsive to a rate signal.

13. The apparatus of claim 11 further comprising a receiver for receiving speech samples and a compressor for compressing said speech samples in accordance with a variable rate vocoder format to provide said variable rate packets.

14. The apparatus of claim 13 further comprising an error correction coder for coding said variable rate packets.

15. The apparatus of claim 11 further comprising an interleaver for interleaving said variable rate packets.

16. An apparatus for transmitting variable rate packets of data symbols comprising:

a channel packetizer having an input for receiving said variable rate packets and for dividing each of said variable rate packets including more than a threshold number of said data symbols into a traffic packet and into an overflow packet, each said traffic packet being provided to a first packetizer output and each said overflow packet being provided to a second packetizer output, said channel packetizer responsive to a rate signal;

a first modulator having an input for receiving said traffic packet and for modulating said traffic packet in accordance with an orthogonal code sequence of a plurality of orthogonal code sequences and having a first output for providing said orthogonal code sequence modulated traffic packet;

a first PN modulator having an input for receiving said orthogonal code modulated traffic packet and for modulating said orthogonal code modulated traffic packet in accordance with a first PN sequence;

a second modulator having an input for receiving said overflow packet and for modulating said overflow packet in accordance with a second orthogonal code sequence of said plurality of orthogonal code sequences and having a second output for providing said orthogonal code modulated overflow packet;

a second PN modulator having an input for receiving said orthogonal code modulated overflow packet and for modulating said orthogonal code modulated overflow packet in accordance with a second PN sequence which is non-orthogonal to said first PN sequence; and a transmitter having a first input coupled to said first modulator output and having a second input coupled to said second modulator output, said transmitter further having an output.

17. The apparatus of claim 16 further comprising a variable rate vocoder for receiving speech samples and for compressing said speech samples in accordance with a variable rate vocoder format to provide said variable rate packets.

18. The apparatus of claim 17 further comprising an encoder for error correction coding said variable rate packets.

19. The apparatus of claim 18 further comprising an interleaver for reordering said variable rate packets, said encoder being disposed between said variable rate vocoder and said interleaver.

20. In a system in which variable rate packets of data symbols including in excess of a threshold number of said data symbols are each transmitted as a traffic packet and an overflow packet, an apparatus for receiving said variable rate packets of data symbols comprising:

a traffic demodulator configured to demodulate said traffic packet received by said apparatus using a first pseudonoise (PN) sequence and a sequence of a first set of orthogonal sequences to provide a demodulated traffic packet;

an overflow demodulator configured to demodulate said overflow packet received by said apparatus using a second pseudonoise (PN) sequence and a second sequence of said first set of orthogonal sequences to provide a demodulated overflow packet; said overflow demodulator dynamically allocated based on whether said variable rate packets of data symbols exceed a threshold number of said data symbols, wherein said first PN sequence is temporally offset and non-orthogonal to said second PN sequence; and a combiner configured to combine said demodulated traffic packet and said demodulated overflow packet to provide said variable rate packets.

21. The apparatus of claim 20, wherein said traffic demodulator further comprises:

an orthogonal traffic sequence generator configured to generate a traffic sequence; and an orthogonal traffic despreader configured to receive said demodulated traffic packet and to despread said demodulated traffic packet using said traffic sequence, wherein said overflow demodulator further comprises:

an orthogonal overflow sequence generator configured generate an overflow sequence; and an orthogonal overflow despreader configured to receive said demodulated overflow packet and to despread said demodulated overflow packet using said overflow sequence.

22. The apparatus of claim 20, wherein said combiner continuously monitoring said traffic demodulator and said overflow demodulator.

23. The apparatus of claim 20, wherein said combiner monitors said overflow demodulator only when instructed by said traffic demodulator.

24. An apparatus for transmitting variable rate packets of data symbols comprising:

a channel packetizer configured to receive said variable rate packets and, when a number of said data symbols included in ones of said variable rate rackets exceeds a threshold value to split each of said ones of said variable rate packets into a traffic packet and at least one overflow packet;

a first modulator configured to receive said traffic packet and to modulate said traffic packet in accordance with a first code sequence; and a second modulator configured to receive said at least one overflow packet and to modulate said at least one overflow packet in accordance with a second code sequence that is orthogonal to the first code sequences if usage of orthogonal code sequences is low, and otherwise to modulate said at least one overflow packet in accordance with a code sequence that is not orthogonal to the first code sequences; wherein the first modulator is further configured to modulate said code sequence modulated traffic packet in accordance with a first pseudorandom noise (PN) sequence; and wherein the second modulator is further configured to modulate said at least one code sequence modulated overflowed packet in accordance with at least one additional PN sequence wherein said at least one additional PN sequence is nonorthogonal to said first PN sequence.

25. The apparatus of claim 24, further comprising:

a transmitter configured to transmit said traffic packet on a traffic channel and to transmit at least one overflow packet on at least one overflow channel.

26. The apparatus of claim 24 further comprising a variable rate vocoder configured to receive speech samples and to compress said speech samples in accordance with a variable rate vocoder format to provide said variable rate packets.

27. The apparatus of claim 26 further comprising an encoder configured to error correction code said variable rate packets.

28. The apparatus of claim 27 further comprising an interleaver configured to reorder said variable rate packets, said encoder being disposed between said variable rate vocoder and said interleaver.

29. A method for transmitting variable rate packets of data symbols comprising:

receiving said variable rate packets;

splitting ones of said variable rate packets into a traffic packet and at least one overflow packet when a number of said data symbols included in ones of said variable rate packets exceeds a threshold value;

modulating said traffic packet in accordance with a first code sequence; and modulating said at least one overflow packet in accordance with a second code sequence that is orthogonal to the first code sequence if usage of orthogonal code sequences is low, and otherwise modulating said at least one overflow packet in accordance with a second code sequence that is not orthogonal to the first code sequence, modulating said code sequence modulated traffic packet in accordance with a first pseudorandom noise (PN) sequence; modulating said at least one code sequence modulated overflow packet in accordance with at least one additional PN sequence wherein said at least one additional PN sequence is non-orthogonal to said first PN sequence; and transmitting said traffic packet on a traffic channel and transmitting at least one overflow packet on at least one overflow channel.

30. The method of claim 29 further comprising:
receiving speech samples; and
compressing said speech samples in accordance with a variable rate vocoder format to provide said variable rate packets.

31. The method of claim 29 further comprising error correction coding said variable rate packets.

32. An apparatus for transmitting variable rate packets of data symbols comprising:
means for receiving said variable rate packets;
means for splitting ones of said variable rate packets into a traffic packet and at least one overflow packet when a number of said data symbols included in ones of said variable rate packets exceeds a threshold value;
means for modulating said traffic packet in accordance with a first code sequence; and
means for modulating said at least one overflow packet in accordance with a second code sequence that is orthogonal to the first code sequence if usage of orthogonal code sequences is low, and otherwise for modulating said at least one overflow packet in accordance with a second code sequence that is not orthogonal to the first code sequence means for modulating said code sequence modulated traffic packet in accordance with a first pseudorandom noise (PN) sequence; means for modulating said at least one code sequence modulated overflow packet in accordance with at least one additional PN sequence wherein said at least one additional PN sequence is non-orthogonal to said first PN sequence; and means for transmitting said traffic packet on a traffic channel and for transmitting at least one overflow packet on at least one overflow channel.

33. The apparatus of claim 32 further comprising:
means for receiving speech samples; and
means for compressing said speech samples in accordance with a variable rate vocoder format to provide said variable rate packets.

34. The apparatus of claim 32 further comprising means for error correction coding said variable rate packets.

35. An apparatus for receiving variable rate packets of data symbols transmitted as a traffic packet and an overflow packet, comprising:
a traffic demodulator configured to demodulate said traffic packet using a first code sequence; and
an overflow demodulator configured to demodulate said overflow packet using a second code sequence that is orthogonal to the first code sequence if usage of orthogonal code sequences is low, and otherwise to modulate said overflow packet using a second code sequence that is not orthogonal to the first code sequence; wherein said traffic demodulator is further configured to demodulated said traffic packet using a first pseudonoise (PN) sequence to provide a demodulated traffic packet; and wherein said overflow demodulator is further configured to demodulated said overflow packet using a second pseudo-noise (PN) sequence to provide a demodulated overflow packet; wherein said first PN sequence is temporally offset and non-orthogonal to said second PN sequence.

36. The apparatus of claim 35 further comprising:
a combiner configured to combine said demodulated traffic packet and said demodulated overflow packet to provide said variable rate packets.

37. The apparatus of claim 35 wherein said overflow demodulator is dynamically allocated based on whether said variable rate packets of data symbols exceed a threshold number of said data symbols.

38. A method for receiving variable rate packets of data symbols transmitted as a traffic packet and an overflow packet, comprising:
demodulating said traffic packet using a first code sequence; and
demodulating said overflow packet using a second code sequences that is orthogonal to the first code sequence if usage of orthogonal code sequences is low, and otherwise to modulating said overflow packet using a second code sequence that is not orthogonal to the first code sequence; demodulating said traffic packet using a first pseudo-noise (PN) sequence to provide a demodulated traffic packet; demodulating said overflowed packet using a second pseudo-noise (PN) sequence to provide a demodulated overflow packet; wherein said first PN sequence is temporally offset and nonorthogonal to said second PN sequence; and combining said demodulating said demodulated traffic packet and said demodulated overflowed packet to provide said variable rate packets.

39. An apparatus for receiving variable rate packets of data symbols transmitted as a traffic packet and an overflow packet, comprising:
means for demodulating said traffic packet using a first code sequence; and
means for demodulating said overflow packet using a second code sequence that is orthogonal to the first code sequence if usage of orthogonal code sequences is low, and otherwise for modulating said overflow packet using a second code sequence that is not orthogonal to the first code sequence; means for demodulating said traffic packet using first pseudo-noise (PN) sequence to provide a demodulated traffic packet; means for demodulating said overflow packet; wherein said first PN sequence is temporally offset and non-orthogonal to said second PN sequence; and means for combining said demodulated traffic packet and said demodulated overflow packet to provide said variable rate packets.

* * * * *